Aug. 12, 1947.          E. W. DAVIS          2,425,515
LUBRICATING APPARATUS
Filed Oct. 7, 1942          4 Sheets-Sheet 2
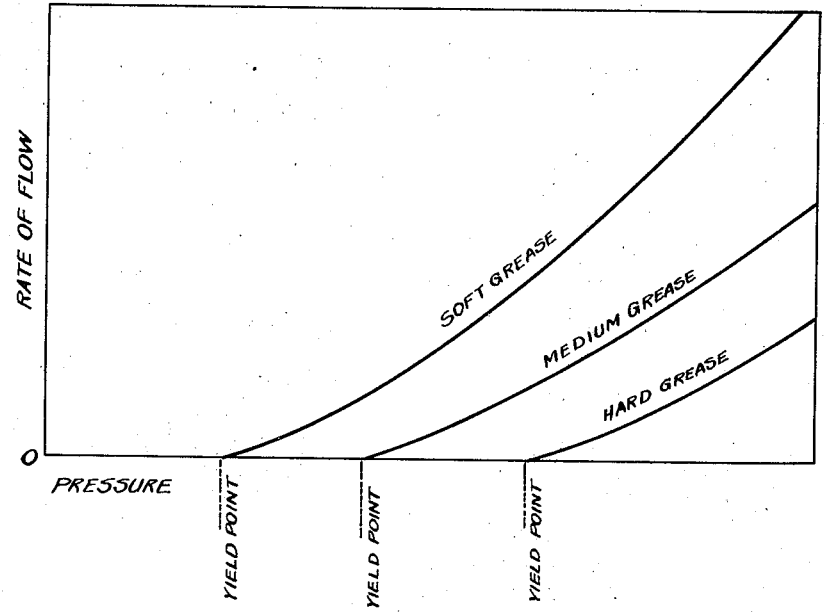
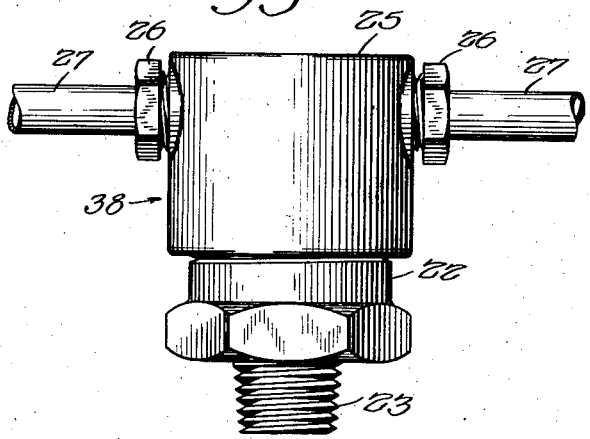
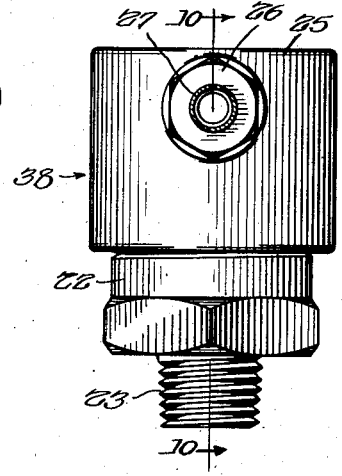
Inventor:
Ernest W. Davis Aug. 12, 1947.  E. W. DAVIS  2,425,515
LUBRICATING APPARATUS
Filed Oct. 7, 1942  4 Sheets-Sheet 3
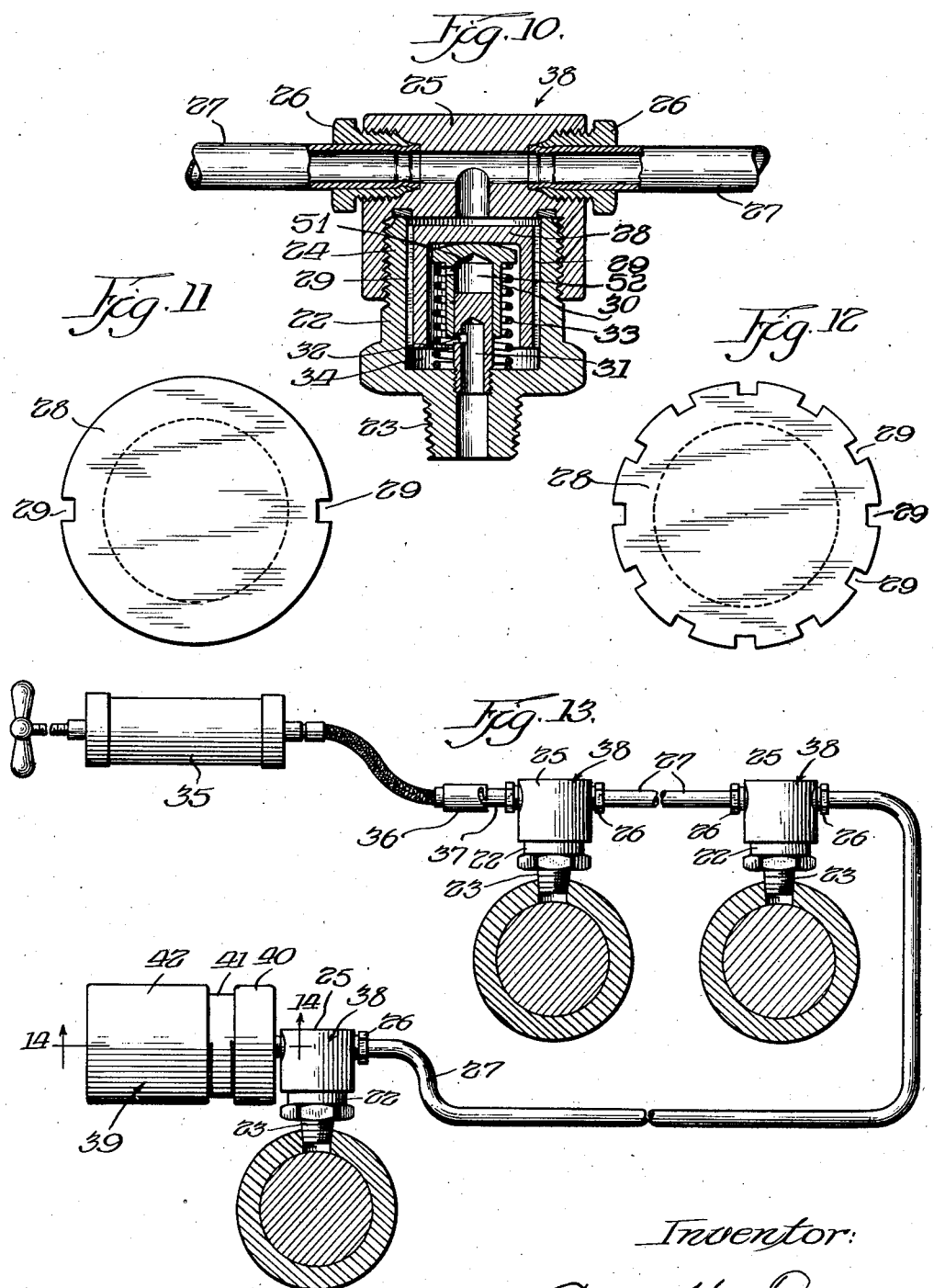

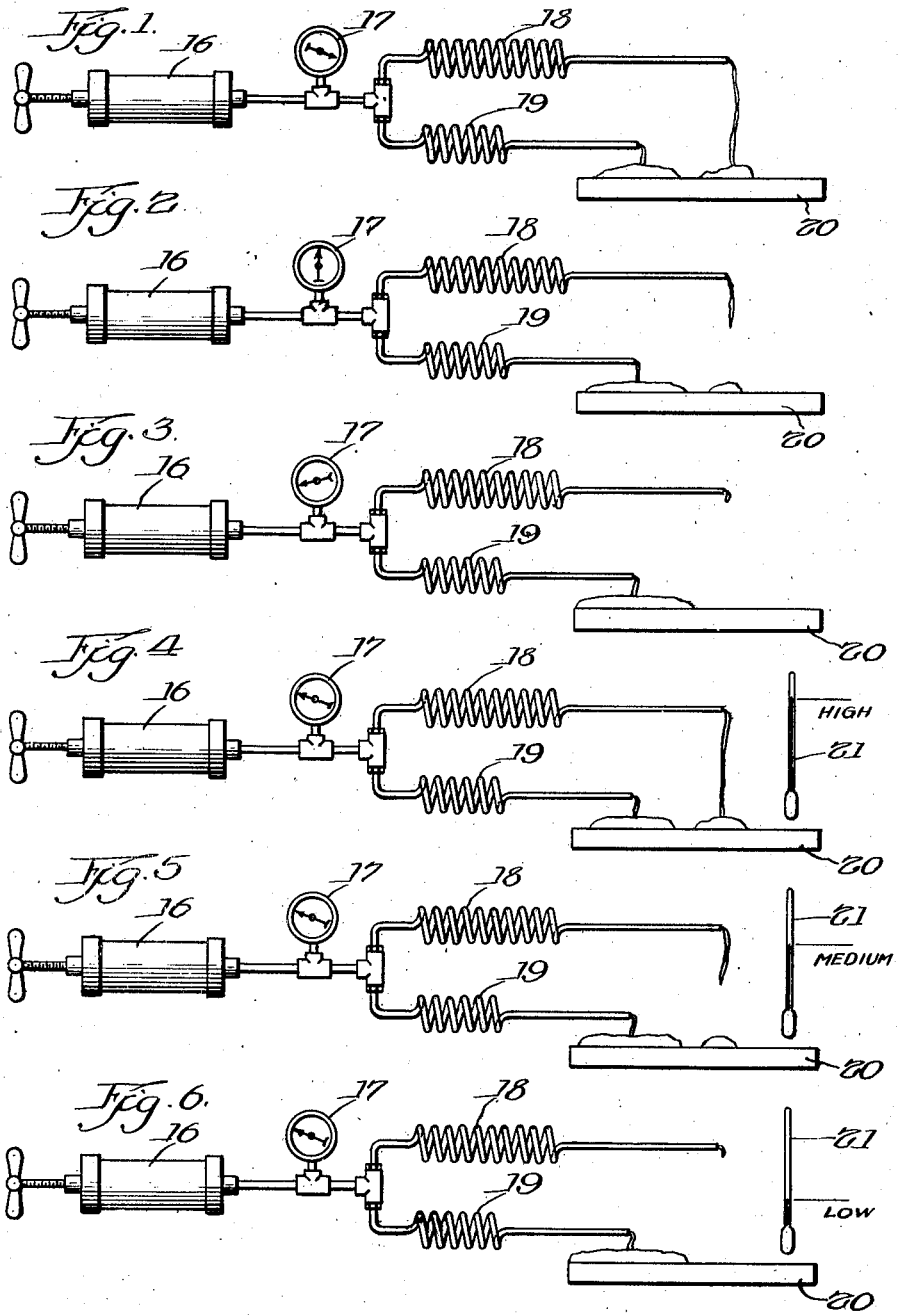

Patented Aug. 12, 1947

2,425,515

UNITED STATES PATENT OFFICE 2,425,515

LUBRICATING APPARATUS

Ernest W. Davis, River Forest, Ill.

Application October 7, 1942, Serial No. 461,096

8 Claims. (Cl. 184—7)

My invention relates to lubricating apparatus and particularly to centralized greasing systems in which the flow of grease to a plurality of bearings is regulated by means of resistance passageways.

The general object of my invention is to provide a greasing system of the class described which is efficient and dependable in operation and which can be manufactured and installed at low cost.

A more specific object is to provide a greasing system of the class described which will accurately proportion the flow of grease regardless of substantial variations in the physical properties of different greases which might be used therein.

Another object is to provide a greasing system of the class described which will accurately proportion the flow of grease regardless of substantial differences in the grease pressure applied to the system at different times, or to differences in pressure applied to different parts of the system at the same time.

Another object is to provide means for accurately proportioning the flow of grease to a plurality of bearings having different resistance to the flow of grease therethrough.

Another object is to provide means for accurately proportioning the flow of grease to bearings at substantially different distances from the source of grease pressure.

Another object is to provide means for accurately proportioning the flow of grease under substantial variations in ambient temperature.

A further object is to provide a greasing system of the class described which is suitable for use with high pressure and which also permits the use of flow restricting passageways of substantial transverse area so as to prevent clogging. These and other objects will appear as the description proceeds.

These objects are attained by providing a grease line containing a plurality of flow-regulating devices, each having an outlet valve actuated by mechanism that is responsive to a pressure difference produced by shunted, flow-restricting passageways, proportional in number to the desired rate of flow, as will be explained specifically hereinafter.

In the drawings:

Figures 1 to 6, inclusive, illustrate apparatus for conducting certain experiments pertaining to the flow of grease through restricting passageways;

Figure 7 is a graphic representation of the flow characteristics of various greases;

Figure 8 is a side elevation of a flow-regulating device for proportioning the flow of grease into a bearing;

Figure 9 is an end elevation of the flow-regulating device;

Figure 10 is a longitudinal section of the flow-regulating device, the section being taken on the line 10, 10, in Figure 9;

Figure 11 is an enlarged plan view of the piston shown in Figure 10;

Figure 12 is an enlarged plan view of a similar piston designed for producing a greater rate of flow than the piston illustrated in Figure 11;

Figure 13 illustrates a simple, hand operated greasing system employing flow-regulating devices such as the one illustrated in Figure 10;

Figure 14:
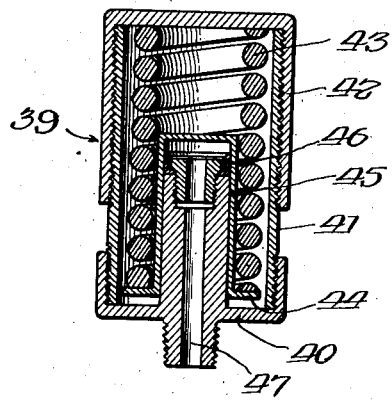
Figure 14 is a longitudinal section of the accumulator shown in Figure 13.

Before describing this lubricating system in detail, it will be advantageous to analyze the results of the experiments illustrated in Figures 1 to 6. These experiments and the theorems derived therefrom will afford a clear understanding of the system as described hereinafter, and will provide evidence of errors in previously accepted theories upon which prior devices depend for their operation.

Figure 1 illustrates a simple experiment for determining the relative rate of flow of grease through a plurality of dissimilar flow-restricting passageways connected in multiple with a source of grease pressure. The apparatus comprises a grease gun 16, a pressure gauge 17, a plurality of coiled tubes (flow-restricting passageways) 18, and 19, and the necessary conduits and connections for connecting the tubes 18 and 19 in multiple with the grease gun as shown. Any suitable surface 20 may be arranged for receiving the grease discharged through the tubes 18 and 19, the appearance of the relative amounts so discharged providing a rough indication of the relative rates of flow.

With the apparatus arranged in this manner, if the handle of the grease gun is turned moderately fast, so as to build up a moderately high pressure (as indicated by the gauge 17), grease will flow from the tubes 18 and 19, as shown in Figure 1. If now the grease pressure is reduced (as indicated by the gauge 17 in Figure 2) by turning the handle of the grease gun more slowly, the relative amount of grease discharged through the tube 18 will be less than was obtained with the higher pressure. And if the pressure is dropped still lower (as indicated by the pressure gauge in Figure 3), no grease at all will be discharged from the tube 18. The reason is obvious when it is considered that any flow-restricting passageway filled with grease provides a resistance capable of preventing any flow whatever unless the applied pressure exceeds a certain minimum, critical pressure, referred to hereinafter as the "yield point" below which no flow of grease occurs. This yield point varies with the dimensions of the flow-restricting passageway, and with its temperature, and with the physical characteristics of the grease, as will be readily understood.

The experiments illustrated in Figures 1, 2, and 3 furnish data from which the following theorem 1 may be derived:

*Theorem 1.*—In a plurality of dissimilar, flow-restricting passageways connected in multiple with a source of grease pressure, the ratio of discharge through those passageways varies for different grease pressures.

The apparatus used in Figures 4, 5, and 6 is the same as that used in the previous experiments except that the thermometer 21 is added to indicate the various temperatures of the grease in the tubes 18 and 19 during the succeeding stages of the experiment. With this apparatus, the previously described experiments are repeated except that the temperature is varied instead of the pressure, as indicated by the successive readings of the pressure gauge 17 and the thermometer 21. The results of these experiments show that a given grease pressure produces different relative rates of flow through the tubes 18 and 19 under variations in temperature, and that a sufficiently low temperature will prevent discharge of grease through the tube 18, as shown, thereby furnishing data from which the following theorem 2 may be derived:

*Theorem 2.*—In a plurality of dissimilar, flow-restricting passageways connected in multiple with a source of grease pressure, the ratio of discharge through those passageways varies for different temperatures of the grease.

The graphic diagram Figure 7 illustrates characteristic flow curves of various greases under different pressures. It will be noted that the "yield points" of the various greases vary considerably, and that the flow curves do not coincide in value at any given pressure.

The experiment about to be described cannot be illustrated to advantage, but if the experiments illustrated in Figures 4, 5, and 6 are repeated by using various greases of different consistencies and all at the same temperature, instead of using the same grease at different temperatures, the results will be generally similar. With light grease the relative rates of discharge through the tubes 18 and 19 will be generally similar to those shown in Figure 4; with grease of medium consistency the relative rates of flow will be generally the same as shown in Figure 5; and with heavy grease the results will be generally the same as shown in Figure 6. These experiments furnish data from which the following theorem 3 may be derived:

*Theorem 3.*—In a plurality of dissimilar, flow-restricting passageways connected in multiple with a source of grease pressure, the ratio of discharge through those passageways varies with different physical properties of different greases discharged therethrough.

These three theorems explain why prior centralized lubricating systems of the resistance type cannot be depended upon for satisfactory performance when grease is used as a lubricant. Another reason is that relatively high pressure is usually necessary in order to conduct the grease to those bearings which are more remote from the source of grease pressure. Ordinarily this necessitates the use of restricting passageways of small bores which are liable to clog, either with impurities in the grease or with soap which becomes separated from the oil in the grease when the grease is forced slowly through a small opening.

In the present invention these objections are overcome by providing a pressure reducing valve in each flow-regulating device for maintaining a low pressure difference across the flow-restricting means, and by constructing the flow-restricting means with a plurality of resistance passageways of identical dimensional construction connected in multiple with each other, the number of said passageways being directly proportional to the required rate of flow for each flow-regulating device, as will be explained more fully hereinafter.

Figure 15:
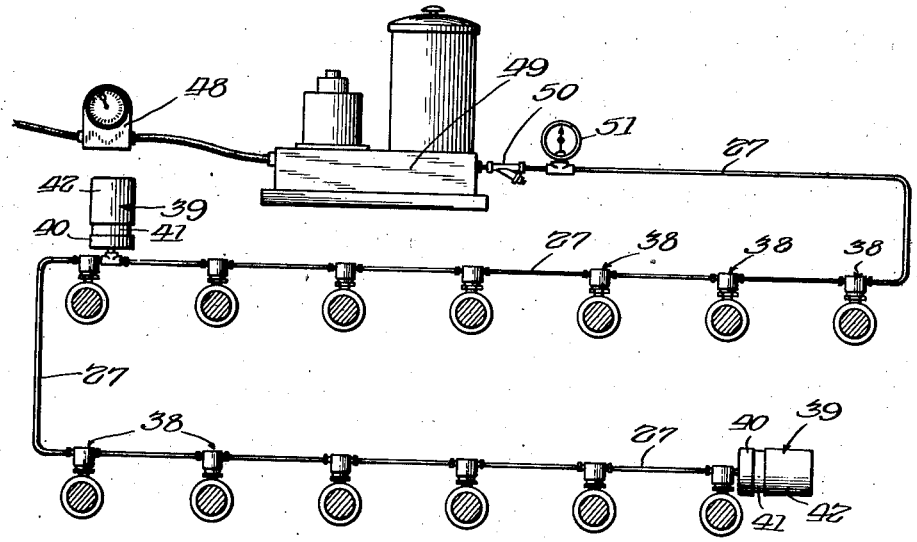
Figure 15 illustrates an automatic centralized greasing system employing the flow-regulating devices and accumulators of this invention.

The flow-regulating device of this invention comprises a cylinder 22, Figure 10, provided with a screw threaded portion 23 for attachment to a bearing, and having a threaded portion 24 for holding the cylinder head 25. The cylinder head 25 is provided with couplings 26, for attaching the tubes 27. One of these tubes conducts grease under pressure to the flow-regulating device, and the other tube conducts grease to other similar flow-regulating devices distributed in the grease line, as shown in Figures 13 and 15.

The piston 28, Figure 10, is movable longitudinally in the cylinder 22 and is provided with grooves 29, for conducting grease from the space above the piston 28 to the space 34, below the piston. The sleeve valve 30 slides vertically on the tubular member 31 whereby the single port 32 is covered to varying degrees by the sleeve valve 30. The spring 33 yieldingly urges the piston 28 towards the cylinder head 25, and the grease pressure above the piston 28 moves the piston and likewise the sleeve valve 30 in a downward direction, thereby reducing the area of the opening at the port 32. The vent opening 51 permits the escape of grease from the cavity 52 during downward movement of the sleeve valve 30.

The operation of this flow regulating device is as follows: When the grease pressure moves the piston 28 downwardly so as to nearly close the port 32, the throttling action thereby produced causes an increase in the grease pressure in the space 34 below the piston 28. This tends to balance the pressure above the piston, so that the spring 33 may move the piston 28 upwardly a very short distance, whereupon the increased opening of the port 32 and the consequent reduction of pressure in the space 34, will cause the piston 28 to be moved downwardly again by the grease pressure above the piston 28.

The sleeve valve 30 thus tends to assume a balanced position, where it maintains a small pressure difference between the upper and lower ends of the piston 28, which pressure difference is determined by the strength of the spring 33. This spring 33 is of uniform strength in the several flow-restricting devices which may be used in a single installation. If the resistance to flow in one bearing should be greater than that of another bearing, it will produce a higher back pressure at the outlet of the corresponding flow-regulating device; this will tend to move the sleeve valve 30 to its open position; and in this manner compensation is effected for variations in bearing resistance.

The sleeve valve 30 and associated parts thus act as a pressure reducing valve to maintain a constant, low pressure for forcing grease through the grooves 29. The number of grooves 29 in the piston 28 may vary in different flow-regulating devices so as to provide rates of flow suitable for the respective bearings to which the flow-regulating devices are attached. Figure 11 illustrates a piston with two grooves, and Figure 12 illustrates a piston with twelve grooves, which is designed to provide a rate of flow six times as fast as the piston in Figure 11. The springs in different flow-regulating devices are all of equal strength, and the grooves are all of identical dimensional construction, so that the rate of discharge of any particular flow-regulating device is proportional to the number of grooves in the piston, regardless of variations in line pressure, bearing resistance, room temperature, or the physical properties of the many lubricants suitable for use with the lubricating system of this invention.

In the hand operated, centralized lubricating system illustrated in Figure 13, the grease gun 35 is provided with a detachable coupling 36, which may be attached to a nipple 37 for supplying grease to the entire system. The flow-regulating devices 38 are attached to the bearings requiring lubrication, and at some point in the grease line an accumulator 39 is provided for the purpose of maintaining a flow of grease after the grease gun 35 has been removed.

The internal construction of the accumulator 39 is illustrated in Figure 14. The body member 40 carries a cylinder 41 provided with a cap 42 which bears against the spring 43. The lower end of the spring 43 bears against the flange 44, and thereby urges the grease cylinder 45 to move downwardly, thereby applying pressure to the grease in the grease cylinder 45. The cup leather 46 prevents leakage of the compressed grease, which is forced slowly through the port 47 and back into the grease line 27.

In the automatic greasing system illustrated in Figure 15 the time switch 48 is set to operate the electric grease pump 49 at regularly recurring, intermittent time intervals of predetermined, relatively short duration. A strainer 50 is provided for removing impurities from the grease, and the pressure gauge 51 is connected in the grease line 27 for visibly indicating the operating stages of the system. A flow-regulating device 38, such as previously described, is attached to each bearing requiring lubrication and accumulators 39 are provided for maintaining pressure in the system for a short time interval immediately following each opening of the time switch 48.

At each operation of the electric grease pump 49 a measured quantity of grease is discharged into the grease line 27, whereupon the grease pump is stopped by the time switch 48. The amount of grease pumped during each lubricating operation is in excess of the combined discharge of all of the flow-regulating devices during the short time the grease pump is in operation, so that the excess grease is discharged into the accumulators 39, and returned to the grease line 27 during the time the pump is idle.

The time switch is so regulated that the quantity of grease delivered by the grease pump 49 during one cycle of operation, is no more than the combined capacity of the accumulators 39, and the time interval between pumping operations is more than sufficient to permit the flow-regulating devices 38, to deliver the quantity of grease supplied by one operation of the pump. If desired, heavy oil may be used in the pump instead of grease.

The advantages of this lubricating system overcome the difficulties experienced with prior centralized, resistance-controlled systems intended for use with grease. Grease has physical properties resembling a highly viscous liquid and also properties resembling a solid—for instance it has a yield point—so that the flow of grease through a passageway is resisted only slightly by its inertia, and to a far greater degree by its viscosity, and by the force required to exceed its yield point, both of which forces are variable. The combined effect of these variables produces a complex condition which is apparently too complicated for the application of mathematical calculations ordinarily used for determining a rate of flow.

Prior centralized greasing systems depend for their operation upon the erroneous assumption that the flow of grease through multiple connected, dissimilar passageways is governed by some simple, regular law of flow (similar to Ohm's law in electricity), by virtue of which the relative dimensions of the passageways determine the ratio of flow. The three theorems derived from the verifiable data hereinbefore described, and also the pressure necessary for overcoming the yield point, as illustrated in Figure 7, would seem to disprove the possibility of any such simple and regular law.

In the lubricating system of this invention, the only law relied upon is the common, general law which states that "Identical causes produce identical effects." All the restricting passageways in this system are of identical construction; they are all subjected to the same pressure; and they are all filled with the same kind of lubricant. Ordinarily, the only variable is the number of restricting passageways in the various flow-regulating devices, and as this number is proportional to the required discharge rate of each flow-regulating device, the relative discharge rates of those devices are proportional to their respective requirements. Ordinarily, the temperature of all the flow-regulating devices in the system will be equal at any given time, but under extraordinary conditions, wherein bearing misalignment or overload causes abnormal friction and heat in one of the bearings, then the heat conducted to the corresponding flow-regulating device and the resulting increase in flow, might be more of an advantage than a disadvantage.

While the embodiment of my invention as herein shown and described relates solely to a centralized greasing system, the new principle involved may be utilized in lubricating apparatus other than a centralized lubricating system.

I claim:

1. In a centralized grease lubricating system including a plurality of parts, each requiring lubrication in predetermined proportions to the others, and each provided with a lubricating-receiving connection: the combination of a flow-regulating device for each part; each flow-regulating device having an inlet, and an outlet connected to the lubricant-receiving connection for its part; a supply line connected to all the inlets of said devices, for the substantially simultaneous delivery of lubricant under pressure to all of them; each device including at least one calibrating passage; all the calibrating passages in a plurality of different devices having the same cross section and length, and the same yield point and flow characteristics; different devices having different numbers of passages arranged in parallel, in numbers proportional to the proportions of lubricant required by the different parts; whereby the predetermined proportions of lubricant supplied to the different parts remain unaffected by changes in supply pressure, in temperature, or in the physical characteristics of the lubricant employed; each device including spring pressed piston means for maintaining a constant pressure drop in said passages; the pressure drop in the passages of all devices being the same; means for intermittently imposing high pressure on said supply line; and resilient storage means adapted to receive and store lubricant from said pressure line during periods of high pressure, and return the stored lubricant at a lower pressure to said line after the high pressure has ceased.

2. In a centralized grease lubricating system including a plurality of parts, each requiring lubrication in predetermined proportion to the others, and each provided with a lubricant-receiving connection; the combination of a flow-regulating device for each part; each flow-regulating device having an inlet, and an outlet connected to the lubricant-receiving connection for its part; a supply line connected to all the inlets of said devices; each device including at least one calibrating passage; all the calibrating passages in a plurality of different devices having the same yield point and flow characteristics; different devices having different numbers of passages arranged in parallel, in numbers proportional to the proportions of lubricant required by the different parts; whereby the predetermined proportions of lubricant supplied to the different parts remain unaffected by changes in supply pressure, in temperature, or in the physical characteristics of the lubricant employed; each device including means for maintaining a constant pressure drop in said passages; means for intermittently imposing high pressure on said supply line; and resilient storage means adapted to receive and store lubricant from said pressure line during periods of high pressure, and return the stored lubricant at a lower pressure to said line after the high pressure has ceased.

3. A system according to claim 2, in which said means for maintaining a constant pressure drop in said passages includes resilient means adapted to yield under high pressure in said inlet and cover an outlet port on the low pressure side of said passages, whereby the passage of excess lubricant through said device during periods of high pressure is prevented.

4. A system according to claim 2 in which said means for maintaining a constant pressure drop in said passages includes resilient means adapted to yield under high pressure in said inlet and cover an outlet port on the low pressure side of said passages; and in which said storage means maintains a pressure sufficient to keep said port at least partly closed, whereby the passage of excess lubricant through said device during periods of high pressure is prevented.

5. In a centralized grease lubricating system including a plurality of parts, each requiring lubrication in predetermined proportion to the others, and each provided with a lubricant-receiving connection; the combination of a flow-determining device for each part; each flow-determining device having an inlet, and an outlet connected to the lubricant-receiving connection for its part; a pressure supply line connected to all the inlets of said devices; each device including at least one calibrating passage; all the calibrating passages in a plurality of different devices having the same yield point and flow characteristics; different devices having different numbers of passages, in numbers proportional to the proportions of lubricant required by the different parts; whereby the predetermined proportions of lubricant supplied to the different parts remain unaffected by changes in supply pressure, in temperature, or in the physical characteristics of the lubricant employed.

6. In a centralized grease lubrication system including a plurality of parts, each requiring lubrication in predetermined proportion to the others, and each provided with a lubricant-receiving connection; the combination of a flow-determining device for each part; each flow-determining device having an inlet, and an outlet connected to the lubricant-receiving connection for its part; a pressure supply line connected to all the inlets of said devices; each device including at least one calibrating passage; all the calibrating passages in a plurality of devices having the same yield point and flow characteristics; different devices having different numbers of passages, in numbers proportional to the proportions of lubricant required by the different parts; whereby the predetermined proportions of lubricant supplied to the different parts remain unaffected by changes in supply pressure, in temperature, or in the physical characteristics of the lubricant employed; each device including spring pressed piston means for maintaining a constant pressure drop in said passages; said passages extending along said pistons from end to end thereof, whereby the cross section and length of the effective passages is not changed by piston displacement.

7. In a centralized grease lubricating system including a plurality of parts, each requiring lubrication in predetermined proportion to the others, and each provided with a lubricant-receiving connection; the combination of a flow-determining device for each part; each flow-determining device having an inlet, and an outlet connected to the receiving connection for its part; a supply line connected to all the inlets of said devices; each device including at least one calibrating passage; all the passages in a plurality of devices having the same yield point and flow characteristics; different devices having different numbers of passages, in numbers proportional to the proportions of lubricant required by the different parts; whereby the predetermined proportions of lubricant supplied to the different parts remain unaffected by changes in supply pressure, in temperature, or in the physical characteristics of the lubricant employed; each device including spring pressed piston means for maintaining a constant pressure drop in said passages; said passages being constructed and arranged so that movement of said piston does not alter their yield point and flow characteristics.

8. In a centralized grease lubricating system of the type comprising a supply line; a plurality of parts requiring lubrication; and a plurality of flow-regulating devices each connected to receive lubricant from said line and deliver lubricant to an associated part; the combination of a set of flow-regulating devices each having a selected number of flow-restricting passages arranged in parallel; the passages of all said flow-regulating devices having substantially equal flow-restricting characteristics; said passages in each device being proportional in number to the volume of lubricant required by the associated part; and automatic means for maintaining the same difference in pressure across all said passages, whereby each part will receive its required amount of lubricant.

ERNEST W. DAVIS.

REFERENCES CITED

The following references are of record in the file of this patent:

UNITED STATES PATENTS

| Number | Name | Date |
|---|---|---|
| 2,255,439 | Schmidt | Sept. 9, 1941 |
| 2,310,636 | Howard | Feb. 9, 1943 |
| 1,950,134 | Bradbury | Mar. 6, 1934 |
| 2,224,216 | Coberly | Dec. 10, 1940 |
| 2,041,198 | McLean | May 19, 1936 |
| 2,117,303 | Dinzl | May 17, 1938 |
| 891,377 | Samuelson | June 23, 1908 |
| 1,813,122 | Moore | July 7, 1931 |
| 780,986 | Francis | Jan. 31, 1905 |
| 1,972,907 | Shaw | Sept. 11, 1934 |

FOREIGN PATENTS

| Number | Country | Date |
|---|---|---|
| 295,954 | Great Britain | Feb. 21, 1929 |